United States Patent [19]

Valencic et al.

[11] Patent Number: 5,014,811
[45] Date of Patent: May 14, 1991

[54] BATTERY RETAINING SYSTEM

[75] Inventors: Terence E. Valencic, Mentor; John E. Wible, Painesville, both of Ohio

[73] Assignee: Caterpillar Industrial Inc., Mentor, Ohio

[21] Appl. No.: 548,409

[22] Filed: Jul. 5, 1990

[51] Int. Cl.$^5$ .................. B60K 28/00; B60R 16/04
[52] U.S. Cl. ................................. 180/286; 180/68.5; 180/167; 180/290
[58] Field of Search ............... 180/68.5, 167, 169, 180/271, 286, 290; 250/239, 561

[56] References Cited

U.S. PATENT DOCUMENTS

| 3,989,118 | 11/1976 | Hanson | 140/68.5 |
|---|---|---|---|
| 4,355,695 | 10/1982 | Leskovec | 180/68.5 |
| 4,496,274 | 1/1985 | Pipes | 180/68.5 |
| 4,511,637 | 4/1985 | Evans | 180/68.5 |
| 4,903,054 | 2/1990 | Wible | 250/561 |
| 4,951,768 | 8/1990 | Littmann et al. | 180/68.5 |

Primary Examiner—Andres Kashnikow
Assistant Examiner—Richard Camby
Attorney, Agent, or Firm—Alan J. Hickman

[57] ABSTRACT

A system for retaining a battery on a frame of a vehicle has a retaining device which is movable between a first position at which the battery is free to move in a passing relationship relative to a side of the frame and second position at which the battery is retained on the frame and from passing movement relative to the frame side. A sensing device delivers electromagnetic radiation, receives electromagnetic radiation and delivers a first control signal in response to receiving electromagnetic and delivers a second control signal in the absence of receiving electromagnetic radiation. An obstructing device is movable to block the sensing device from receiving electromagnetic radiation in response to the retaining device being at the first position. A controller receives the first and second signals and delivers a vehicle disabling signal in response receiving the second signal. The system is particularly suitable for use on an automatic guided vehicle.

15 Claims, 3 Drawing Sheets

BATTERY RETAINING SYSTEM

DESCRIPTION

1. Technical Field

This invention relates to a battery retaining system and more particularly to a battery retaining system for a vehicle battery in which the position of the battery retaining device is sensed and powered operation of the vehicle is prevented in response the retaining device being at a first position.

2. Background Art

Vehicles, and particularly material handling vehicles, have utilized retention devices such as, straps, bars, flanges, threaded fasteners and the like to hold a battery in place on the vehicle frame and prevent inadvertent movement of the battery. In some vehicles, for example, internal combustion powered material handling vehicles, the battery is used for powering the starting, ignition, and accessory systems of the vehicle. Such batteries are relatively small in size, light in weight and infrequently replaced as they are charged onboard the vehicle during operation of the vehicle engine. Thus, any of the many well known low strength battery retention devices available are suitable for use in such applications. Installation of a replacement battery the technician may neglect to properly install the battery restraint which can cause damage to the battery and associated vehicle componentry under the dynamics of long term vehicle operation.

In applications wherein the vehicle is powered by an electric drive motor a large capacity battery pack is required to provide an adequate number of vehicle operating hours between battery charging or battery replacement. Typically, the battery pack is sized to provide approximately eight hours of vehicle operation before the discharged battery is replaced with a fully charged battery. Thus, the battery may be replaced three or more times during a working day of twenty four hours by lifting the battery from the vehicle. With this high replacement frequency it is important that a minimal amount of time be spent in battery removal and replacement. The battery restraints in use in such vehicles have been designed to be removed or released as quickly as possible so that battery may be lifted from the vehicle as quickly as possible. However, even with the use of the most efficient battery restraints, the time required to exchange the batteries is considered excessive by most in the industry.

To assist in reducing the time and effort it takes to replace a discharged battery with a charged battery, rollers have been added to the vehicle. The rollers are rotatively mounted on the vehicle frame and support the battery so that the battery may be easily transferred from the vehicle to the battery charging station. The addition of the rollers has increased the efficiency of battery removal as the battery is easily rolled off the vehicle, usually sideways relative to the vehicle frame, and on to the stand, rack or the like of the charging station. By increasing the ease of battery translation the need to restrain the battery is even more important as inadvertent movement of the battery during operation is easier and more pronounced. The restraint used to secure a battery varies depending upon the vehicle configuration. However, it must be easily and quickly positioned between battery retaining and releasing positions. Due to the ease of releasing the battery from restraint, the ease of rolling the battery off of the vehicle and the ease of rolling a replacement battery into position on the vehicle, the technician involved in this process may forget to lock or properly install the battery restraint in position on the vehicle. The frequency of such an error by the technician is related to the number of vehicles being services in a given period of time and the amount of time allotted to the operator to return the vehicles to operation. As a result of this error the battery may inadvertently roll unrestricted from the battery compartment, during operation of the vehicle and under normal vehicle dynamics, and render the vehicle inoperative. This inadvertent movement can break the electrical wires connecting the battery to the vehicle electrical system, damage the electrical system, the battery and other components of the vehicle.

The need to provide a battery retaining system which forces the technician to install the battery restraint before the vehicle is set into operation is extremely important in order that the aforementioned damage may be eliminated. This is particularly important in applications wherein the battery is powering a driverless automatic guided vehicle. Because there is no driver on the vehicle, the ability for a driver to sense an unlatched battery is not possible, and the potential for the previously noted damage is increased.

It has been known to place a plurality of sensors on a vehicle to sense the absence or presence of a load on the vehicle. Such sensors include an assortment of electromagnetic devices which deliver signals to a vehicle control system which notifies the control system of the position of the load on the vehicle. In automatic guided vehicles movement of the vehicle is prohibited until the load is either fully on or off the vehicle. These sensors serve only this function and are not associated with other vehicle conditions, for example, is the battery locked in position on the vehicle by the battery restraint.

The present invention is directed to overcoming one or more of the problems as set forth above.

DISCLOSURE OF THE INVENTION

In one aspect of the present invention, a system for retaining a battery on a frame of a vehicle, is provided. The retaining system includes a sensing device for delivering electromagnetic radiation, for receiving electromagnetic radiation, and delivering a first control signal in response to receiving electromagnetic radiation and a second control signal in the absence of receiving electromagnetic radiation. A retaining device selectively maintains the battery on the frame, and is movable between a first position at which the battery is restrained from movement in a passing relationship relative to a preselected location on the frame and a second position at which said battery is free to move in a passing relationship relative to said preselected location on the frame. An obstructing device is provided for blocking electromagnetic radiation from receipt by the sensing device in response to the retaining device being at the second position. A controlling device receives the first and second control signals and disables the vehicle in response to receiving the second control signal.

The retaining system senses the condition of the battery restraint and delivers a control signal to the controlling device which either enables or disables the vehicle depending on the position of the restraint. Thus, the potential for the battery to roll off the vehicle and damage the associated componentry is overcome.

The retaining system utilizes the same electromagnetic sensor used for identifying the position of the load on the vehicle and a mechanical obstructing device which blocks the electromagnetic sensor when the retaining device is not in a battery locking position. Therefore, cost and system complexity are kept to a minimum and thus system reliability is at a maximum.

Since the vehicle is disabled, the brakes are applied and the motors are neutralized, when the battery restraint is in the second load passing position the potential for inadvertent movement of the battery is eliminated.

BEST MODE FOR CARRYING OUT THE INVENTION

Figure 1:
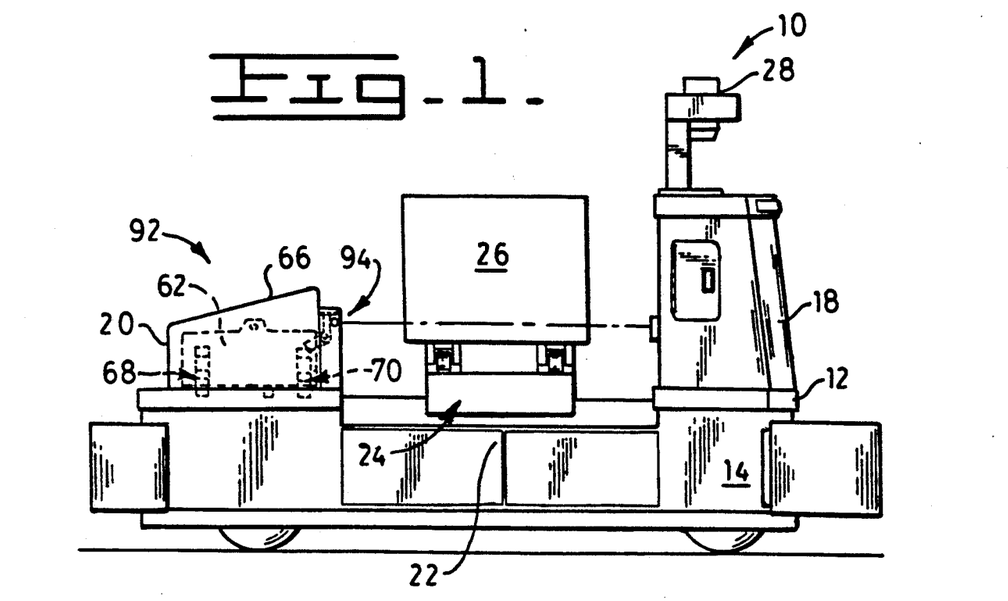
FIG. 1 is a diagrammatic side elevational view of an automatic guided vehicle disclosing an embodiment of a battery retention system of the present invention.
Figure 2:
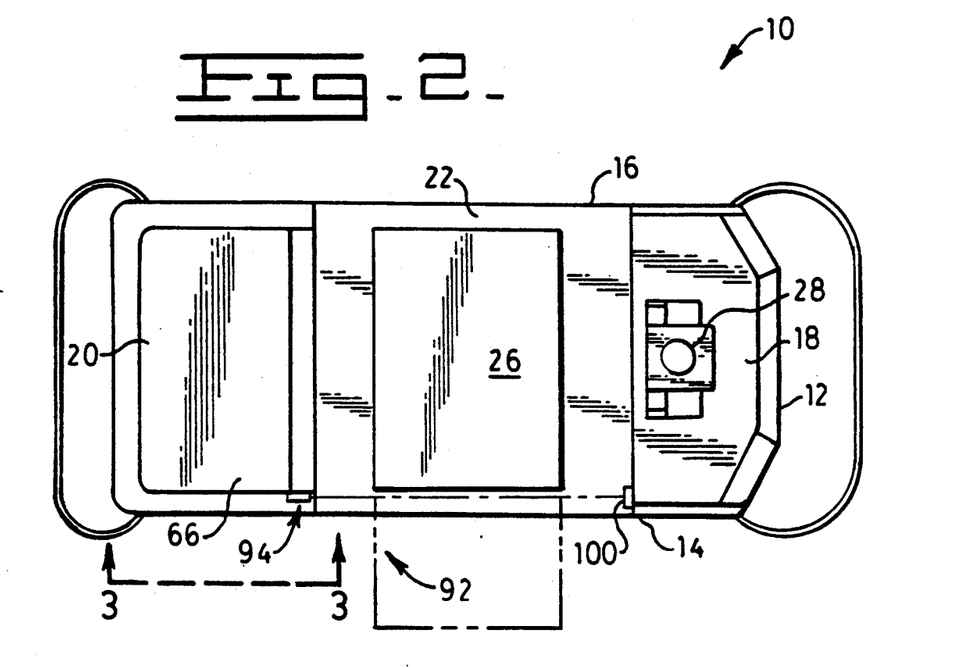
FIG. 2 is a diagrammatic top elevational view of the automatic guided vehicle of FIG. 1.

With reference to the drawings, and particularly FIGS. 1 and 2, a material handling vehicle 10, for example a driverless automatic guided vehicle (AGV), having a frame 12, first and second spaced apart sides 14,16, first and second spaced apart end portions 18,20, and a middle portion located between the first and second end portions 18,20 is disclosed.

The vehicle 10 has a load carrying device 24 which is connected to the frame 12 and located at the middle portion 22 between the first and second end portions 18,20. The load carrying device is preferably a telescopic side loader, however, other devices, for example, fixed and elevationally movable platforms, powered and unpowered roller decks, and side loading lift mast assemblies of conventional design are considered equivalents. The load carrying device supports a load 26 on the vehicle frame 12 at a first load location between the first and second sides 14,16 and facilitates movement of the load transverse the vehicle sides 14,16 to a second load location spaced from the first load location and spaced from the vehicle 10. The load 26 is supported at the second load location on any suitable support (not shown), for example, a load stand, conveyor, rack and the like located within the facility in which the vehicle 10 operates. The load 26 may be moved by the load carrying device 26 or any suitable external device (not shown), in a passing relationship relative to at least one of the sides 14,16, when the vehicle is docked at a load stand.

Figure 5:
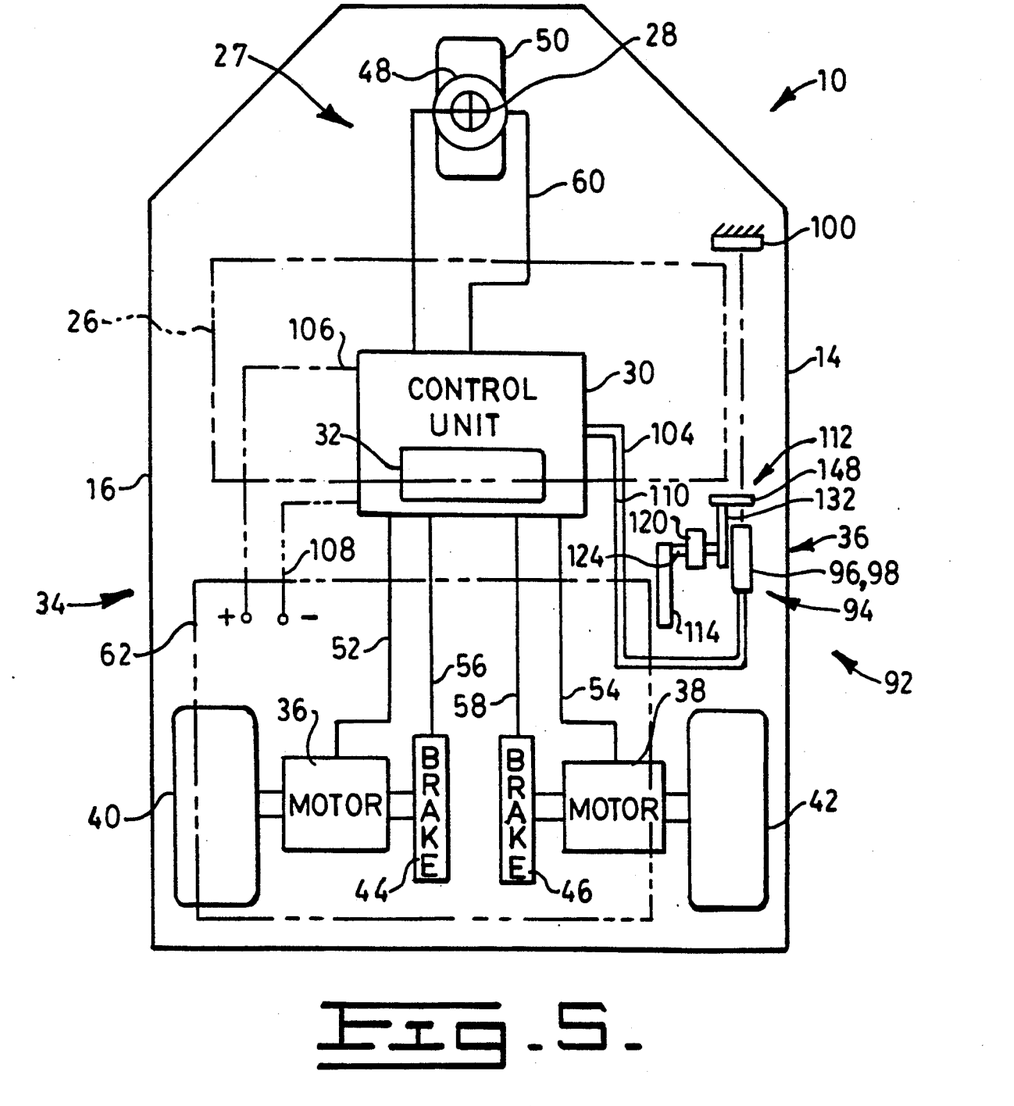
FIG. 5 is a diagrammatic schematic representation of an embodiment of the controlling system of the present invention.

As best seen in FIGS. 1, 2 and 5 the automatic guided vehicle 10 is preferably an electrically powered free ranging self guided vehicle which is capable of operating without guide wires imbedded in the floor or tape or other such equivalents attached to the floor or ceiling of the facility. The automatic guided vehicle has a guidance system 27 which includes a laser scanner 28 and a control means 30 connected to the scanner 28. The laser scanner 28 reads a plurality of coded targets (not shown) located within the facility and delivers digital signals to the control means 30. The control means 30 includes a processor 32 of any suitable type, for example a microprocessor, which receives the signals and based on the location of the read targets calculates the location of the vehicle 10. The vehicle 10 also has a plurality of sensors, such as steering angle, wheel rotation, and position transducers (not shown) which are connected to the control means 30. The transducers are used to inform the processor 32 of the sensed vehicle conditions, and based on preprogrammed instructions, the processor 32 controls operation of the vehicle 10 in what is often referred to as a dead reckoning mode. The processor 32 calculates, using triangulation, the actual location of the vehicle 10, compares the actual location of the vehicle 10 with the sensed location of the vehicle 10, a derivative of the processed transducer signals, and delivers appropriate control signals to various operating systems 34 of the vehicle 10. The vehicle operating systems 34, which includes steering, braking and drive systems, respond to these signals and make adjustments in steering angle, vehicle speed and the like so that the vehicle 10 is accurately guided along the actual preprogrammed path of operation. Since guidance systems 27 of this type are known in the art no further discussion will be made.

Referring to FIG. 5, the operating systems 34 include first and second electric drive motors 36,38 of conventional design. The first and second drive motors 36,38 are connected to first and second ground engaging wheels 40,42, respectively. The vehicle systems 34 also includes first and second spring applied and electrically released brakes 44,46 of conventional design. The first and second brakes 44,46 are connected to the first and second electric motors 36,38, respectively. A fluid operated rotary steering actuator 48 of conventional design is connected to a pivotally movable third ground engaging wheel 50. The motors 36,38, brakes 44,46 and steering actuator 48 are connected to the controlling means 30 via electrical conductors 52,54,56,58,60, respectively. The motors 36,38, brakes 44,46 and steering actuator 48 are responsive to preprogrammed instructions processed by processor 32, as discussed above, and actuatable in response to signals delivered from the controlling means 30 by conductors 52,54,56,58 and 60, respectively.

A battery 62 is mounted on the frame 12 at the second end portion 20 and located on the frame during operation of the vehicle 10 between the first and second sides 14,16. The battery 62 consists of a plurality of cells disposed in a battery box. The battery 62 is supported on the vehicle frame 12 by a plurality of frame mounted rollers 64. The rollers are oriented so that the battery 62 may be rolled from the vehicle 10 in a direction transverse at least one of the first and second sides 14,16. In particular, the rollers 64 are mounted for rotation on the frame 12 in any suitable known manner such as by a shaft and bracket arrangement (not shown). The rollers 64 guide the battery 64 for relatively easy movement in a passing relationship relative to, preferably, the first side 14.

A shroud 66, which is attached to the vehicle frame 12, covers the battery 62 at the second end portion 20 of the frame 12. The shroud 66 defines the envelope of a battery compartment at the second end portion 20 of the frame 12. The shroud 66 may be open at the first and second frame sides 14,16, so that the battery may be moved past either side 14,16 or closed at one of the sides 14,16 from being exposed and from passing thereby. Alternatively, the shroud 66 may have a door or removable side panel (not shown) at one or both of the first and second sides 14,16 to provide access to the battery 62 and to permit the battery 62 to pass by the side 14,16 adjacent the open door or removed side panel.

Figure 3:
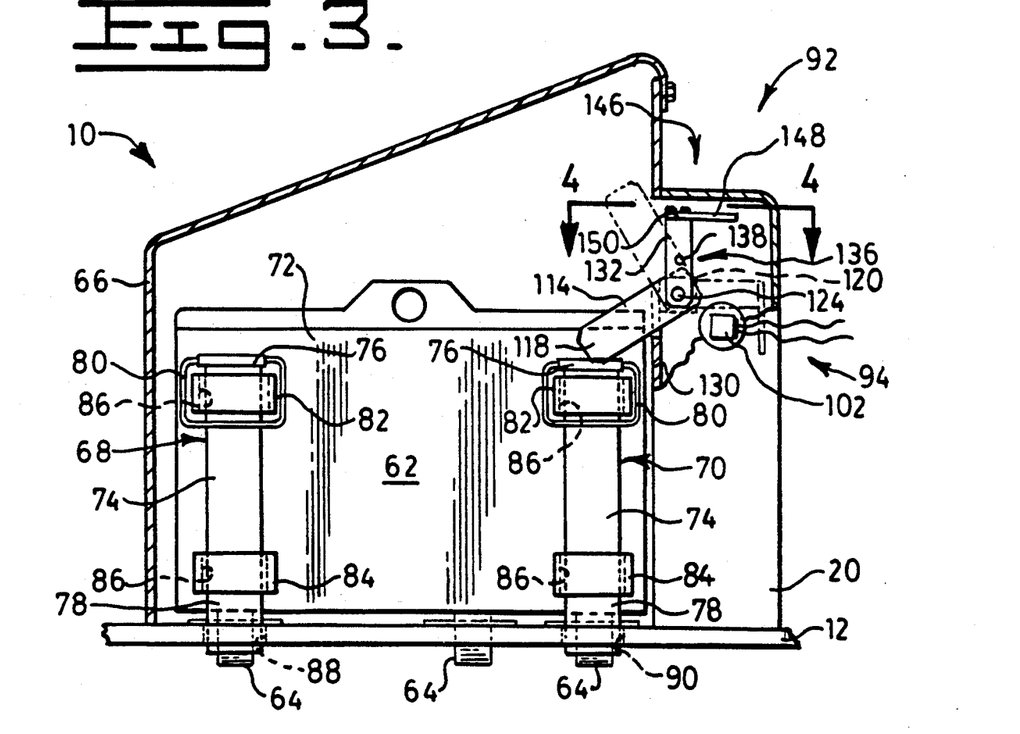
FIG. 3 is a diagrammatic enlarged view taken along lines 3—3 of FIG. 2 showing the battery compartment of the automatic guided vehicle in greater detail.

As best seen in FIG. 3, first and second spaced apart battery restraints 68,70 are connected to the battery 62 at a location on one side 72 of the battery 62 The side 72 of the battery 62 to which the restraints 68,70 are connected is closest to the first side 14 of the vehicle 10, the open side of the shroud 66. The battery restraints 68,70 each include an elongated bar 74 having first and second end portions 76,78 and a handle 80 which is pivotally connected to the first end portion 76 of the bar 74. The handle 80 is preferably constructed from cylindrical bar stock and bent to form a rectangle. The first and second battery restraints 68,70 are each slidably guided by first and second guide brackets 82,84 which are connected at elevationally aligned and spaced apart locations on the side 72 of the battery 62. The elongated bars 74 are each disposed in openings 86 of the first and second guide brackets 82,84 and guided by the first and second guide brackets 82,84 for elevational movement. The openings 86 of the first and second guide brackets 82,84 of each of the first and second battery restraints 68,70, are elevationally aligned so that each of the guide bars are slidably guided therein for linear movement in the aforementioned elevational directions. First and second spaced apart apertures 88,90 are disposed in the vehicle frame 12 or a structural member connected to the vehicle frame 12 (not shown). The first and second apertures 88,90 are spaced a preselected distance apart so that the second end portion 78 of the bars 74 are disposable in the first and second apertures 88,90 when at a battery restraining position and spaced from being disposed in the apertures 88,90 when at a battery releasing position. The bars 74 of the first and second battery restraints 68,70 are aligned with the apertures 88,90 when the battery is at a preselected transverse position relative to the first and second frame sides 14,16. The handles 80 are each pivotal about their connection to a location at which at least a portion of the first guide bracket 82 is disposed therein. At this position the handle 80 prevents elevational movement of the associated bar 74 and retains the bar 74 in the aligned and adjacent aperture 88,90. Pivoting of handles 80 will release the bars 74 from engageability with first guide brackets 82 and allow the bars 74 to be pulled from disposition in the associated aperture 88,90.

Figure 4:
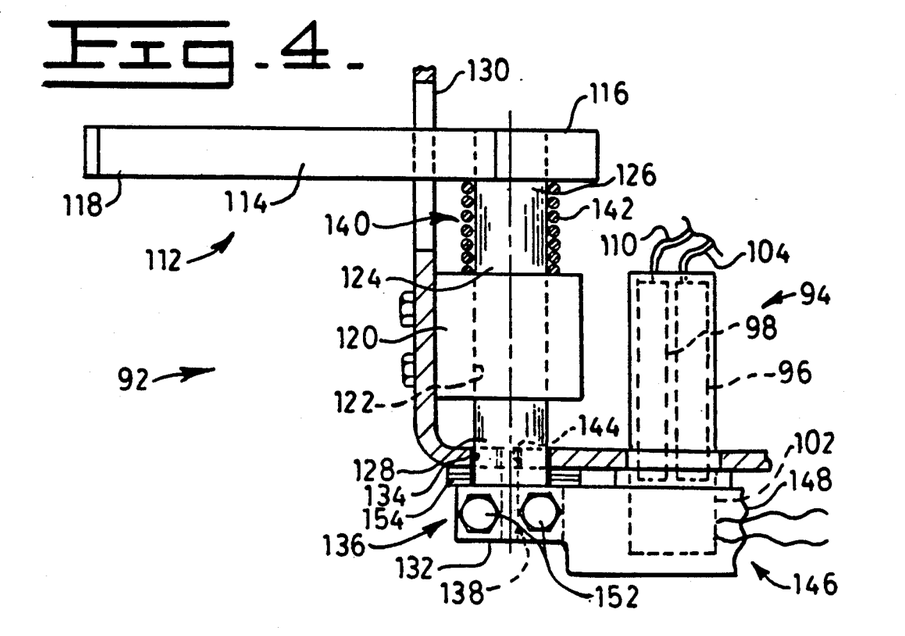
FIG. 4 is a diagrammatic top view taken along lines 4—4 of FIG. 3 showing a portion of the battery restraint system in greater detail.

As best seen in FIGS. 3,4 and 5, a system 92 is provided for retaining the battery 62 on the frame 2 of the vehicle 10. The system 36 includes a sensing means 94 for delivering electromagnetic radiation, for receiving electromagnetic radiation, and delivering a first control signal in response to receiving electromagnetic radiation and a second control signal in the absence of receiving said electromagnetic radiation. It is to be noted that the first and second delivered signals may be simply a change in the state (on or off) of the sensing means 94.

The sensing means 94 has a transmitting portion 96, a receiving portion 98 and is mounted on the second end portion 20 of the frame 12. The sensing means 94 also includes a reflecting member 100 which is mounted on the first end portion 18 of the frame 12. The reflecting member is preferably retroreflective. The transmitting portion 96 directs electromagnetic radiation toward the reflecting member 100 and the reflecting member 100 reflects the transmitted electromagnetic radiation toward the receiving portion 98. The receiving portion 98 is adapted to receive the reflected electromagnetic radiation and deliver the first control signal in response to receiving the reflected electromagnetic radiation. The transmitting portion 96 preferably delivers a light beam and the receiving portion 98 is responsive to the reflected light beam signal.

As best seen in FIGS. 4 and 5 the transmitting and receiving portions 96,98 are disclosed as being portions of a unitary structure having a lens assembly 102 which directs the transmitted light beam to the reflecting member 100 and reflected light beam to the receiving portion 98. The lens assembly assembly 102 includes a mirror (not shown) which reflects the delivered and received light beams at right angles to the transmitting and receiving portions 96,98. Such construction is well known in the art and therefore will not be discussed in any greater detail.

Alternatively, the reflecting member 100 and unitary transmitting and receiving portions 96,98 may be eliminated and replaced by separate transmitting and receiving members (not shown). The transmitting member would be mounted at the location of the unitary transmitting and receiving portions 96,98 and the receiving member 98 would be mounted at the location of the reflecting member 100. Thus the transmitting member 96 would deliver the light beam in a path aimed directly at the receiving member 98 and eliminate the need for the reflecting member 100.

The transmitting portion 96 is connected to the control means 30 by conductor 104, the battery 62 (+) is connected to the control means 30 by conductor 106, and the battery (−) is connected to the controlling means 30 by conductor 108. The conductor 104 delivers electrical energy to the transmitting portion 96. A conductor 110 which is connected to and between the receiving portion 98 and control means 30 delivers the first and second control signals to the controlling means 30. The controlling means 30 receives the control signals and the processor 32, based on preprogrammed instructions, delivers vehicle control signals in response thereto. Should the receiving portion 98 receive a first signal, the processor would deliver an enabling signal which would result in the brakes 44,46 being released, and the motors 36,38 being powered. Since the processor 32 responds to other control signals, as discussed above, a first signal from the receiving means may result in no action if other signals being processed by the computer 30 contradict the first signal. For example, if the controlling means 30 is delivering braking and motor stopping signals the receipt of the first signal by the computer 32 will not result in release of the brakes 44,46 or actuation of the drive motors 36,38. Delivery of the second signal from the sensing means 94 to the controlling means 30 will result in 0 disablement of the drive motors 36,38 and application of the brakes 44,46. The processor 32 commands delivery of brake applying signals and motor stopping signals whenever a second signal is received.

As best seen in FIGS. 1, 2 and 5, the sensing means 94 is located adjacent the first side 14 of the frame 12 at a preselected location so that the load 26, when not properly positioned on the vehicle 10, will block receipt of the reflected signal and cause the sensing means 94 to deliver the second signal. Therefore, during transfer of the load 26 between a load stand (not shown) and the vehicle 10 a second signal will be delivered. Thus inadvertent or premature movement of the vehicle 10 will be prevented. It should be observed that the location of the sensing means 94 is a function of the size of the load 26 and the elevational location of the load 26 when carried on the load carrying device 24. Ideally the load 26 is located between the first and second sides 14,16 when properly positioned. Also, it may be desirable to locate a sensing means 94 adjacent both sides 14,16 of the frame 12, especially in applications when load transfer is from either side 14,16 of the vehicle 10.

Referring to FIGS. 3 and 4, a retaining means 112 is provided for selectively maintaining the battery 62 on the frame 12 at a preselected location on the frame 12 between the first and second sides 14,16. The retaining means 112 is movable between a first position (shown in solid lines in FIG. 3) at which the battery 62 is maintained from moving in a passing relationship relative to the preselected location on the frame 12 and a second position (shown in phantom lines in FIG. 3) at which the battery 62 is free to move in a passing relationship relative to said preselected location on the frame 12. The preselected location is a function of the battery 62 size and the distance between the first and second sides 14,16. The battery 62 must be located between the first and second sides 14,16 in order to operate properly within the facility. The retaining means 112 includes a stop member 114 having first and second spaced apart end portions 116,118, a supporting member 120 having an aperture 122 disposed therethrough and a shaft 124 having first and second spaced apart end portions 126,128. The supporting member 120 is connected to the frame 12 in any suitable manner, such as by threaded fasteners, welding and the like, at a location on the frame second end portion 20 in close proximity to the transmitting portion 96 of the sensing means 94. Specifically, the supporting member 120 is attached to an upstanding flange 130 of the frame 12 which defines a wall of the battery compartment and a member to which the shroud 66 is connected. The supporting member 120 is oriented so that the aperture 122 extends in an axial direction transverse the vehicle sides 14,16 and transverse the path of the of the light beam. The shaft 124 which is oriented axially transverse the vehicle sides 14,16, and oriented in the direction of roller guided battery movement is disposed in aperture 122 and rotatable about the axis of the aperture 122. The stop member 114, which is manufactured from rectangular steel bar stock, is rigidly connected at the stop member first end portion 116 in any suitable manner, such as by welding, to the shaft first end portion 126. The stop member 114 pivots in response to rotation of the shaft 124. The stop member second end portion 118 is pivotally movable between the first and second positions in a plane intersecting the direction of roller guided movement of the battery 62. The stop member second end portion 118 is engageable with the battery 62 at the first position of the retaining means 112 and prevents the battery from passing the predetermined location. The stop member second end portion 118 is spaced from being in the path of movement of the battery 62 and free from engagement with the battery 62 at the second position of the retaining means 112.

The retaining means 112 also includes a lever arm 132 which is rigidly connected to the second end portion 128 of the shaft 124 in any suitable manner, for example, by welding, pressing clamping and the like. The lever arm 132 extends radially from the shaft 124 and pivots with rotation of the shaft 124. The stop member 114 is pivotally movable between the first and second positions in response to pivotal movement of the lever arm 132. The lever arm 132 is preferably but, not necessarily, located outside the flange 130 at the frame first side 14 so that the technician involved in the battery charging operation may access the lever 132 and move the stop member 114 between the aforementioned first and second positions. Aperture 134 is provided in the flange 130 to permit the shaft 124, and particularly the second end portion 128, to extend past the flange 130. The shaft 124, in addition to being rotatable, is guided by the supporting member 120 for axial translation between a first axial position at which the lever arm 132 is adjacent the flange and a second axial position spaced from the first axial position.

An engaging means 136 is provided for engaging the flange 130 and maintaining the stop member 114 from pivotal movement at the first axial position of the shaft 124. The engaging means 136 includes a locking pin 138 which is connected to the lever arm 132 at a predetermined radial distance from the axis of the shaft 124. The locking pin 138 extends from the lever arm 132 in a direction toward the flange 130 which is substantially parallel to the axis of the shaft 124. The locking pin 138 is engageable with the flange 130 at the first axial position of the shaft 124 and maintains the stop member 114 from pivotal movement at the first axial position of the shaft 124. A biasing means 140 is provided for urging the shaft 124 toward the first axial position and from inadvertent movement toward the second axial position. The biasing means 140 includes a compression spring 142 disposed about the first end portion 126 of the shaft 124 and axially between the stop member 118 and the supporting member 120. The spring 142 bears against the stop member 118 and supporting member 120 and forces the locking pin 138 into a bore 144 disposed at a preselected location in the flange 130. The bore 144 and locking pin 138 are axially aligned with each other at the first position of the retaining means 112 (stop member 114). The stop member 114 and the lever arm 132 are maintained from pivotal movement as long as the locking pin 138 is in the bore 144. Forced axial movement of the shaft 124 against the bias of the spring 142 will cause the pin 138 to withdraw from the bore 144 and allow the shaft 124 to rotate and the stop member 114 to pivot between the first and second positions. A washer like shim pack 154 is provided between the flange 130 and the lever arm 132. The shims 154 allow for axial adjustment of the shaft 124.

An obstructing means 146 is provided for blocking electromagnetic radiation from being received by the sensing means 94 in response to the retaining means 112 being at the second position. The obstructing means 146 is connected to the retaining means 112 and movable in response to movement of the retaining means 112. The obstructing means 146 is disposed in the path of electromagnetic radiation at the second position of the retaining means 112 and blocks electromagnetic radiation from being received by the sensing means 94. The obstructing means 146 is spaced from being in the path of electromagnetic radiation at the first position of the retaining means 112 and is free from blocking electromagnetic radiation. The obstructing means 146 includes a covering member 148 which is connected such as by threaded fasteners 152 to an end portion 150 of the lever arm 132. The covering member 148 is manufactured from any suitable material capable of blocking light and has substantially rectangular shape. The lever arm 132 has a preselected length which terminates at the end portion 150. The length is measured radially from the axis of said shaft 124 to the end portion 150 of the lever arm 132. The covering member 148 is movable with the lever arm 132, and as indicated above, blocks electromagnetic radiation at the second position of the stop member 114 and allows electromagnetic radiation to pass thereby at the first position of the stop member 114. Since the obstructing means blocks electromagnetic radiation when the stop member is at the second position the potential for the vehicle 10 to be operating with an unrestrained battery 62 is eliminated.

INDUSTRIAL APPLICABILITY

With reference to the drawings, and in operation the automatic guided vehicle 10, is directed to a service area for battery 62 replacement. At the service area the servicing technician rotates the lever arm 132 so that the stop member 114 is moved from the first position, at which the battery is restrained from passing movement relative to a preselected location on the frame 12 and transverse to the first side 14 of the frame 12, to the second position at which the battery 62 is free to pass the preselected location on the frame and the first side 14. By moving the stop member 114 to the second position the technician has also caused the obstructing means 146 to move into the path of the light beam and block the light from the receiving portion 98 of the sensing means 94. The sensing means 94 responds to the lack of received light by delivering a second signal to the controlling means 30. The processor 32 processes this change of state signal and causes the vehicle drive motors 52,54 to be disabled and the vehicle brakes 44,46 to be applied. By this one action, the technician has changed several vehicle 10 and saved time and effort.

The technician then removes the appropriate shroud 66 side panel or opens the appropriate side door, if any, in order to access the battery 62 and the compartment. In order for the battery 62 to be transferred from the vehicle 10 to the battery stand associated with the service area the operator must release the first and second battery locks 68,70. This is achieved very simply by pivoting the respective handles 80 upwardly and pulling the bars 74 from being disposed in the first and second apertures 88,90. Pivoting of the handles 80 unlocks the bars 74 since the handles no longer surround the first guide brackets 82. Once the first and second battery locks 68,70 are released the battery is easily guided on the rollers 64 transverse the first side 14 and off the vehicle 10. It is to be noted that the conductors 106 and 108 may be disconnected from the battery 62 before or after the battery 62 is removed. This is a function of the length of the conductors 106,108 and other vehicle design criteria.

Once the battery is completely removed from the vehicle 10 a replacement battery 62 is moved into a transversely aligned position with the battery compartment at the second end portion 20 of the vehicle 10 and the rollers 64. The replacement battery 62 is then forced onto the rollers 64 which easily guide the battery 62 into position on the vehicle frame 12. Connection of the battery conductors 106,108 may be made at any appropriate time. The technician then engages the first and second locks 68,70 by moving the bars 74 into the first and second apertures 88,90 and pivoting the handles 80 downward to their locking position. Any of the components of the shroud 66, such as side panels or doors, which were removed or opened are now closed or reattached. The final step in the process is to simply pivot the lever 132 which moves the stop member 114 from the second position to the first position. By this action the battery 62 is prevented from moving in the transverse direction relative to the first side 14 past the predetermined location and the covering member 148 is moved to the light passing position. As discussed above, receipt by the sensing means 94 of the reflected light beam will cause the sensing means to deliver a first signal to the control means 30 which will result in the control means 30 delivering signals to the first and second drive motors 36,38 and the first and second brakes 44,46 and enabling the drive motors 36,38 to drive the vehicle 10 and release the brakes 44,46 so that the wheels 40,42 are free to rotate.

The servicing technician is often under pressure to move several vehicles 10 through the battery 62 replacement cycle in as short a period of time as possible in order to prevent a slow down in the assembly, machining and/or storage activities carried out in the facility. Thus, the potential to neglect carrying out any one of the above tasks is frequently encountered. Should the technician forget to engage the first and second battery locks 68,70 the battery retention system 92 will retain the battery 62 on the vehicle 10 and enable the vehicle 10 to operate. Should the technician neglect to rotate the lever arm 132 place the stop member 114 in the first position the vehicle controlling means 30 will not enable the vehicle to operate as the brakes 44,46 will remain applied and the motors 36,38 will remain disabled.

The automatic guided vehicle 10 carries loads 26 on the load carrying device 24 which is located at the middle portion 22 of the vehicle 10 and transports the load 26 between pick up and drop off locations within the facility. On occasion an acquired load 26 may not be properly positioned on the middle portion 22 of the vehicle 10. This may ultimately affect vehicle operation and the accuracy of subsequent load 26 placement. The sensing means 94 provides the additional feature of insuring that the load is located between the first and second sides 14,16 without the need for any additional sensing systems and the like. Because the transmitting portion 96 of the sensing means 94 of the battery retention system 92 delivers a light signal across the opening of the middle portion 22 of the vehicle 10 and in a path substantially parallel to the first side 14 of the frame 12 at a transverse location adjacent the first side 14, and the receiving portion 98 receives a reflection of the light signal in a path substantially parallel to the first side 14 and at a transverse location adjacent the first side 14 when the light signal is successfully delivered across the middle portion 22, the ability to sense when a load 26 is not fully on the vehicle 10 is provided. Should the load 26 extend past the first side 14, subsequent to the transferring function, the light beam will not be received by the receiving portion 98. This will result in a second signal being delivered to the controlling means 30 which will result in the drive motors 36,38 being disabled and the brakes 44,46 being applied. Therefore, corrective action, such as intervention by a technician, must be taken to remedy the situation.

Other aspects, objects and advantages of the present invention can be obtained from a study of the drawings, the disclosure and the appended claims.

We claim:

1. A system for retaining a battery on a frame of a vehicle, comprising:

sensing means for delivering electromagnetic radiation, for receiving electromagnetic radiation, and delivering a first control signal in response to receiving said electromagnetic radiation and a second control signal in the absence of receiving said electromagnetic radiation;

retaining means for selectively maintaining the battery on said frame, said retaining means being movable between a first position at which said battery is maintained from moving in a passing relationship relative to a preselected location on the frame and a second position at which said battery is free to move in a passing relationship relative to said preselected frame location;

obstructing means for blocking electromagnetic radiation from being received by said sensing means in response to said retaining means being at said second position; and controlling means for receiving said first and second control signals and disabling said vehicle in response to receiving said second control signal.

2. A system, as set forth in claim 1, wherein said frame having first and second end portions and a middle portion located between said first and second portions, and including, a reflecting member mounted on the first end portion of the frame, said sensing means having a transmitting portion, a receiving portion and being mounted on the second end portion of the frame, said transmitting portion directing electromagnetic radiation toward said reflecting member, said reflecting member reflecting said transmitted electromagnetic radiation, and said receiving portion being adapted to receive said reflected electromagnetic radiation and deliver said first control signal in response to receiving said electromagnetic radiation.

3. A system, as set forth in claim 2, wherein said frame has first and second spaced apart sides and a load handling implement mounted on the middle portion of said frame at a location between the first and second sides, said sensing means and reflecting member being mounted on the frame at a location adjacent one of the first and second sides, said load handling implement being adapted to transfer a load transversely relative to one of said sides, said load blocking the sensing means from receiving said reflected electromagnetic radiation in response to the load extending past said one of the first and second sides.

4. A system, as set forth in claim 1, wherein said sensing means delivers electromagnetic radiation along a preselected path and said obstructing means is connected to said retaining means and movable in response to movement of said retaining means, said obstructing means being disposed in the path of said delivered electromagnetic radiation and blocking said electromagnetic radiation at the second position of said retaining means and being spaced from disposition in the path of said delivered electromagnetic radiation and free from blocking said electromagnetic radiation at the first position of the retaining means.

5. A system, as set forth in claim 4, wherein said retaining means includes:

a stop member having first and second spaced apart end portions:

a supporting member having an aperture disposed therethrough and being connected to the frame; and a shaft having first and second spaced apart end portions and being rotatively disposed in the aperture, said stop member first end portion being rigidly connected to the shaft and pivotally movable, in response to rotation of said shaft, said stop member second end portion being engageable with the battery at the first position and spaced from being engageable with the battery at the second position.

6. A system, as set forth in claim 5, wherein said retaining means includes a lever arm rigidly connected to the second end portion of the shaft and extending radially relative to the shaft, said stop member being rotatable between said first and second positions in response to pivotal movement of the lever arm.

7. A system, as set forth in claim 6, wherein said retaining means includes:

a flange having an aperture and being connected to the frame, said flange being positioned between the lever arm and said stop member and said shaft extending through the aperture of said flange, said shaft being axially moveable between a first axial position at which said lever arm is adjacent the flange and a second axial position spaced from the first axial position;

means for engaging the flange and maintaining the stop member from pivotal movement at the first axial position of the shaft.

8. A system, as set forth in claim 7, wherein said engaging means includes a locking pin connected to said lever arm and extending in a direction from said lever arm toward said flange, said locking pin engaging said flange and maintaining said stop member from pivotal movement at the first axial position of the shaft.

9. A system, as set forth in claim 8, wherein said engaging means includes a biasing means for urging the shaft to the first axial position.

10. A system, as set forth in claim 8, wherein said flange has a bore, said locking pin being disposable in the bore in response to the stop member being at the second position and the shaft being at the first axial position.

11. A system, as set forth in claim 6, wherein said lever arm has an end portion spaced from said shaft and said obstructing means includes a covering member, said covering member being connected to said lever arm end portion and movable with said lever arm, said covering member overlying the sensing means and blocking said electromagnetic radiation at the second position of the stop member and passing electromagnetic radiation delivered by said sensing means at the first position of the stop member.

12. A system, as set forth in claim 4, wherein said controlling means enables operation of said vehicle in response to receiving said first control signal.

13. A system, as set forth in claim 4, wherein said controlling means includes a microprocessor, said sensing means being connected to said controlling means, and including;

a drive motor connected to said controlling means; and an electrically actuated brake mechanism connected to said controlling means, said microprocessor processing said first and second signals and delivering motor stopping and brake applying control signals in response to receiving said second signal.

14. A system, as set forth in claim 5, wherein said frame has first and second spaced apart sides and a plurality of rollers mounted on said frame and supporting said battery, said rollers guiding said battery for movement in directions transverse the first and second sides.

15. A system, as set forth in claim 14, wherein said shaft extends in a direction transverse the first and second frame sides and in the direction of roller guided battery movement, said stop second end portion being pivotally movable between the first and second positions in a plane intersecting the direction of roller guided movement of the battery.

* * * * *